United States Patent
Ou et al.

(10) Patent No.: US 8,905,746 B2
(45) Date of Patent: Dec. 9, 2014

(54) CLEANING MECHANISM FOR AN INJECTION MOLDING MACHINE

(71) Applicant: Hon Hai Precision Industry Co., Ltd., New Taipei (TW)

(72) Inventors: Xiao-Lu Ou, Shenzhen (CN); Kai Xu, Shenzhen (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 40 days.

(21) Appl. No.: 13/873,223

(22) Filed: Apr. 30, 2013

(65) Prior Publication Data

US 2013/0318734 A1     Dec. 5, 2013

(30) Foreign Application Priority Data

May 31, 2012   (CN) ........................ 2012 2 0253376 U

(51) Int. Cl.
*B29C 45/17*          (2006.01)

(52) U.S. Cl.
CPC .................................. *B29C 45/1753* (2013.01)
USPC .......................................... 425/225; 425/229

(58) Field of Classification Search
CPC ................................... A21C 5/00; B29C 33/72
USPC ................................................ 425/225, 229
See application file for complete search history.

(56) References Cited

U.S. PATENT DOCUMENTS 6,722,872 B1*   4/2004   Swanson et al. ............... 425/225
8,696,956 B2*   4/2014   Winzinger et al. ............ 425/529

* cited by examiner

*Primary Examiner* — Tim Heitbrink
(74) *Attorney, Agent, or Firm* — Novak Druce Connolly Bove + Quigg LLP

(57) ABSTRACT

A cleaning mechanism for injection molding machine includes a base including a mounting frame, a driving member, a pushing member connected to the driving member, a first movable plate, a first clipping plate, a connection shaft rotatably connected to the first pushing plate, a second movable plate parallel to the first pushing plate, and a second clipping plate. First and second movable plates are movably mounted on the mounting frame. First and second clipping plates are mounted on the mounting frame. The first movable plate is fixed to and perpendicular to a first pushing plate of the pushing member. The second movable plate is corresponding to the first movable plate, and perpendicular to the first pushing plate. When the pushing member is driven by the driving member, the first movable plate moves relative to the first clipping plate, and the second movable plate moves relative to the second clipping plate.

20 Claims, 3 Drawing Sheets

CLEANING MECHANISM FOR AN INJECTION MOLDING MACHINE

BACKGROUND

1. Technical Field

The present disclosure relates to cleaning mechanisms, and particularly to a cleaning mechanism used for an injection molding machine.

2. Description of the Related Art

In an injection molding process, plastic waste is left behind in the molding cavity, so that after molding process, the injection molding machine should be stopped to be cleaned by operators. Because the injection molding machine needs to be started and stopped repeatedly, and the cleaning process is performed manually, a cleaning efficiency is relatively low. In addition, there is a risk of some plastic waste still left behind in the injection molding machine because of operator's carelessness, which causes a relatively low yield of the injection products.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
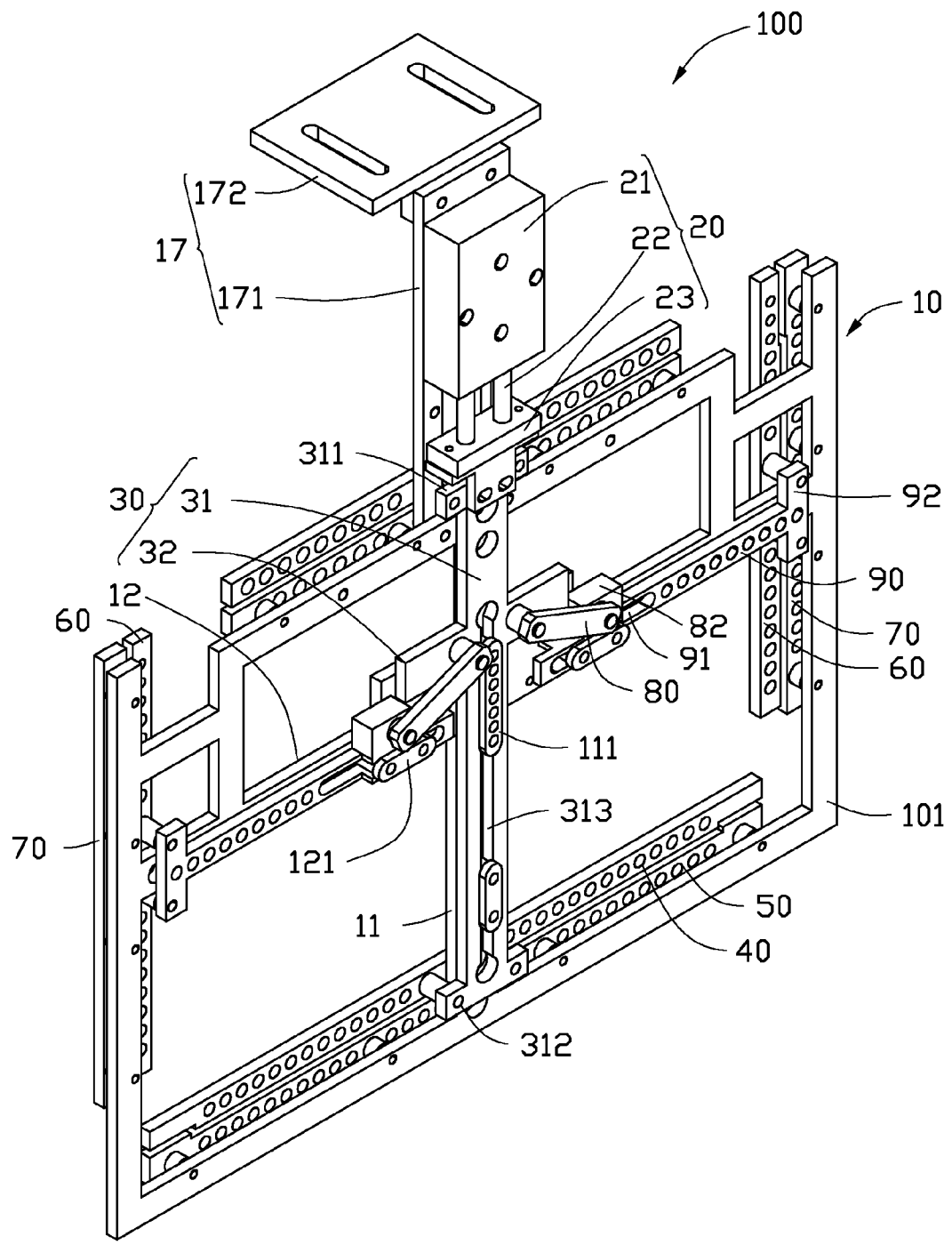
FIG. 1 is an assembled view of a cleaning mechanism of one embodiment.
Figure 2:
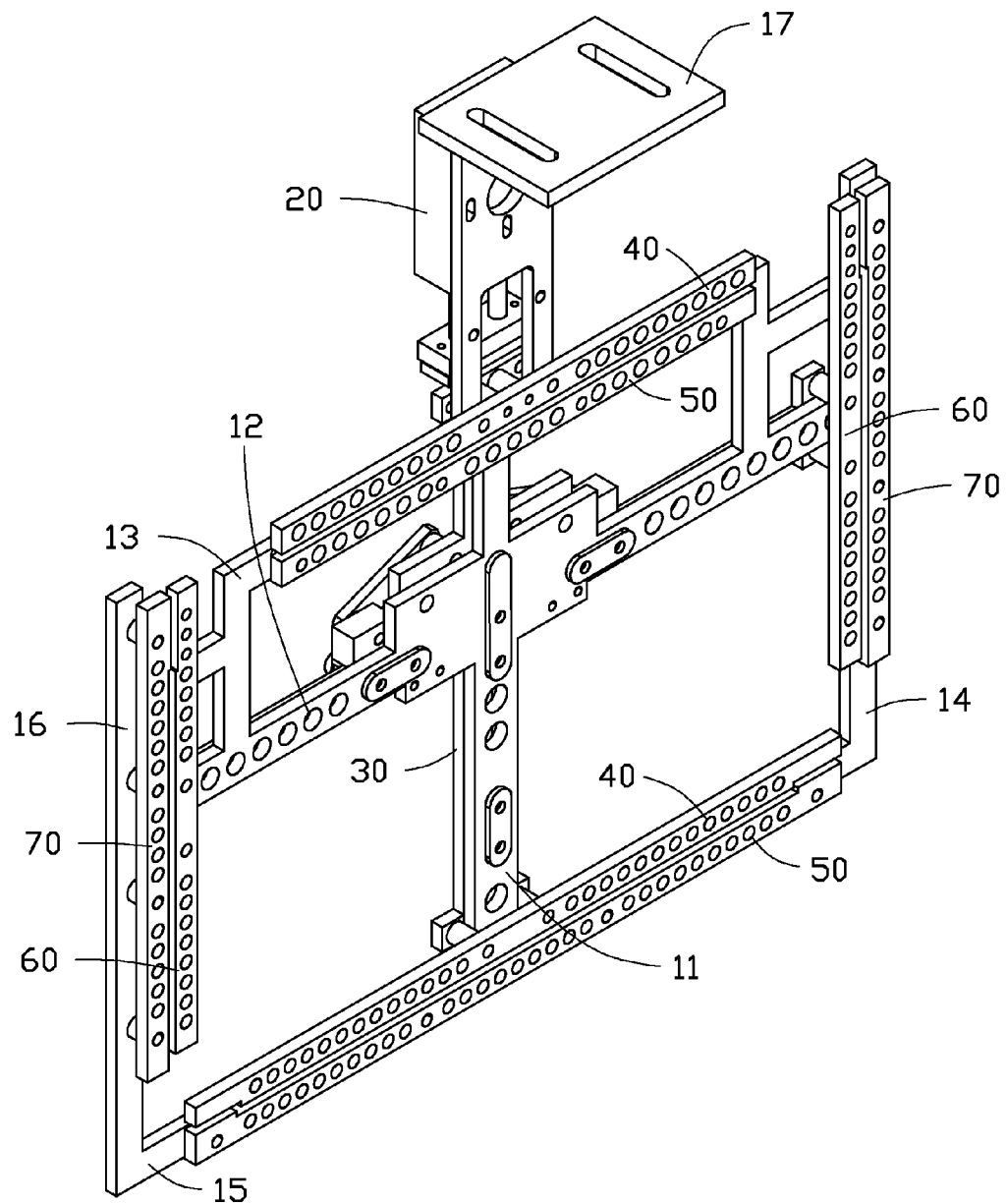
FIG. 2 is similar to FIG. 1, but viewed from another aspect.
Figure 3:
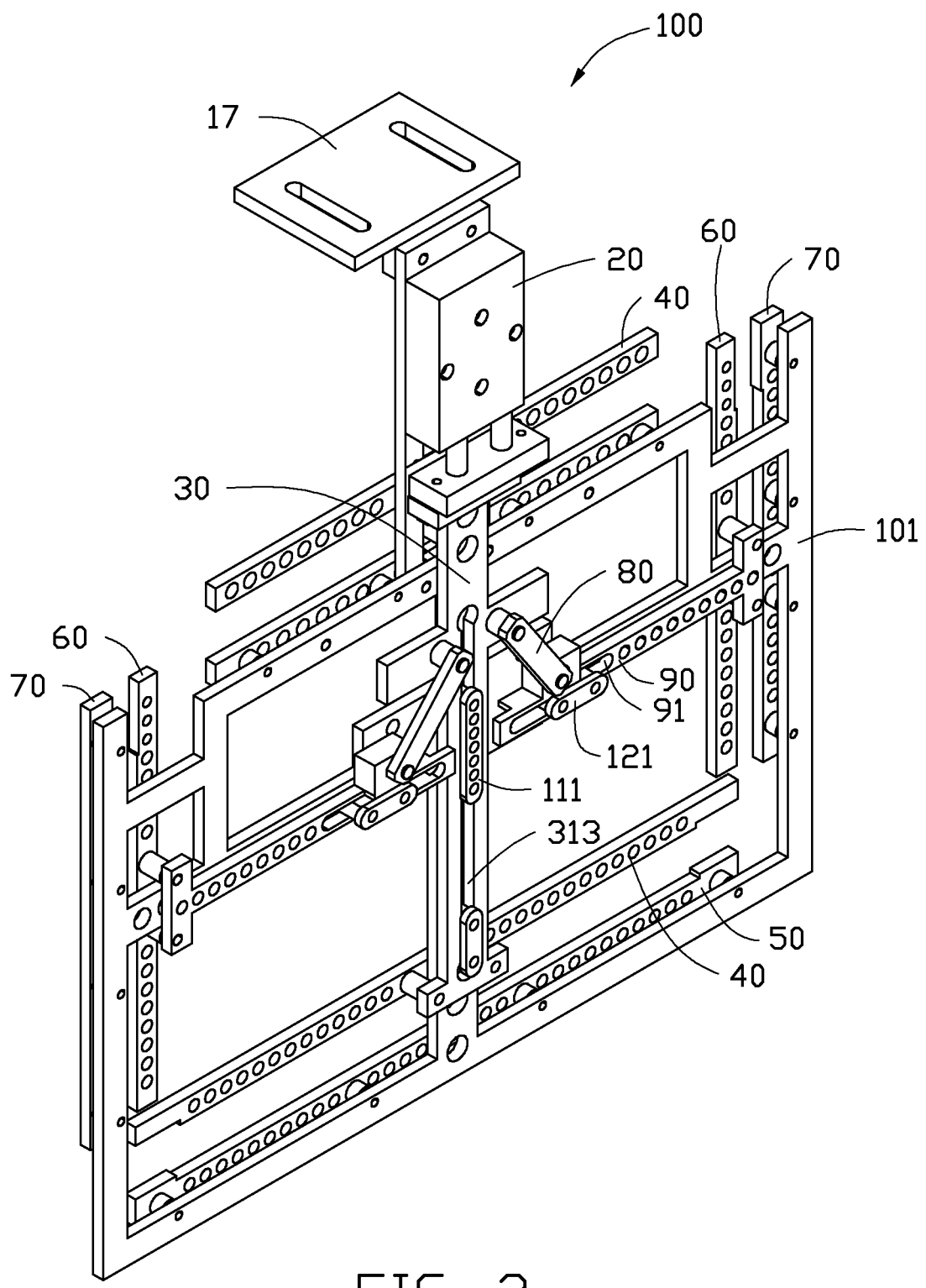
FIG. 3 shows a working state of the cleaning mechanism of FIG. 1.

FIGS. 1 through 3 show an embodiment of a cleaning mechanism 100 for an injection molding machine (not shown). The cleaning mechanism 100 includes a base 10, a driving member 20, a pushing member 30, two first movable plates 40, two first clipping plates 50, two second movable plates 60, two second clipping plates 70, two connection shafts 80, and two connection plates 90. The base 10 includes a mounting frame 101 and a mounting seat 17 fixed to the mounting frame 101. The driving member 20 is mounted on the mounting seat 17. The pushing member 30, the two first movable plates 40, the two first clipping plates 50, the two second movable plates 60, the two second clipping plates 70, the two connection shafts 80, and the two connection plates 90 are placed on the mounting frame 101. When the pushing member 30 is driven by the driving member 20, the first movable plates 40 move relative to the first clipping plates 50, and the second movable plates 60 move relative to the second clipping plates 70.

The mounting frame 101 is substantially frame-like, and includes a first guiding portion 11, a second guiding portion 12 perpendicular to the first guiding portion 11, a first mounting portion 13, a second mounting portion 14, a third mounting portion 15, and a fourth mounting portion 16. The first mounting portion 13, the second mounting portion 14, the third mounting portion 15, and the fourth mounting portion 16 are connected to each other in an end-to-end configuration, and cooperatively form an enclosed frame surrounding the first guiding portion 11 and the second guiding portion 12. One end of the first guiding portion 11 is connected to a substantially middle portion of the first mounting portion 13, and the other end of the first guiding portion 11 is connected to a substantially middle portion of the third mounting portion 15. One end of the second guiding portion 12 is connected to a substantially middle portion of the second mounting portion 14, and the other end of the second guiding portion 12 is connected to a substantially middle portion of the fourth mounting portion 16.

The base 10 further includes a first guiding block 111 placed on the first guiding portion 11, and two second guiding blocks 121 placed on the second guiding portion 12. The two second guiding blocks 121 are symmetrically placed on two sides of the first guiding block 111. The mounting seat 17 includes a first mounting plate 171 and a second mounting plate 172. The first mounting plate 171 is fixed to the end of the first guiding portion 11. The second mounting plate 172 is perpendicularly fixed to the first mounting plate 171.

The driving member 20 is mounted on the first mounting plate 171, and is fixed to the pushing member 30. The driving member 20 includes a main portion 21, a driving shaft 22 connected to the main portion 21, and a connection portion 23 connected to a free end of the driving shaft 22. In the illustrated embodiment, the driving member 20 is a cylinder.

The pushing member 30 includes a first pushing plate 31, a second pushing plate 32 crosswise connected to the first pushing plate 31, a first connection portion 311 formed on one end of the first pushing plate 31, and a second connection portion 312 formed on the other end of the first pushing plate 31 opposite to the first connection portion 311. The first pushing plate 31 is perpendicular to the two first movable plates 40. A first guiding groove 313 is defined in the first pushing plate 31, for slidably receiving the first guiding block 111. The first connection portion 311 passes through the first mounting plate 171, and is fixed to one of the two first movable plates 40. The second connection portion 312 is fixed to the other of the two first movable plates 40.

One of the two first clipping plates 50 is fixed to the first mounting portion 13 and adjacent to the first movable plate 40 fixed to the first connection portion 311, and the other of the two first clipping plates 50 is fixed to the third mounting portion 15 and adjacent to the first movable plate 40 fixed to the second connection portion 312, such that the two first clipping plates 50 are perpendicular to the first pushing plate 31. One of the two second clipping plates 70 is fixed to the second mounting portion 14, and the other of the two second clipping plates 70 is fixed to the fourth mounting portion 16, such that the two second clipping plates 70 are parallel to the first pushing plate 31.

The two connection shafts 80 are rotatably connected to the second pushing plate 32, and placed on two sides of the first pushing plate 31. The cleaning mechanism 100 further includes two connection blocks 82. Each connection block 82 interconnects one end of the connection shaft 80 away from the first pushing plate 31 to one of the two connection plates 90.

A second guiding groove 91 is defined in one end of the connection plate 90 adjacent to the first pushing plate 31, for movably receiving one of the two second guiding blocks 121. The cleaning mechanism 100 further includes two connection frames 92 connected to two ends of the connection plates 90. Each connection frames 92 is sleeved on the second guiding portion 12, and is fixed to the second movable plate 60.

In use, first, the driving member 20 drives the pushing member 30 to move along the first guiding block 111 toward the mounting seat 17, and the pushing member 30 pushes the two first movable plates 40 to move toward the mounting seat 17, such that the first clipping plate 50 is spaced from the corresponding first movable plate 40. One end of the connection shaft 80 moves toward the mounting seat 17 with the pushing member 30, and the connection plate 90 moves along the second guiding block 121 toward the pushing member 30, such that the second movable plate 60 is spaced from the corresponding second clipping plate 70. Second, the cleaning mechanism 100 is inserted into a molding cavity of an injection molding machine (not shown), and then the driving member 20 drives the pushing member 30 to move along the first guiding block 111 away from the mounting seat 17. The first movable plate 40 moves toward the first clipping plate 50, and the first movable plate 40 and the first clipping plate 50 cooperatively clips the left behind (plastic) waste. In a same procedure, the second movable plate 60 and the second clipping plate 70 cooperatively clips the left behind (plastic) waste. Finally, the cleaning mechanism 100 with the left behind waste is taken away from the molding cavity, and the driving member 20 drives the pushing member 30 to move toward the mounting seat 17 to place the waste in a predetermined area.

Because the first movable plates 40 and the second movable plates 60 collect the waste along different directions, a cleaning efficiency is relatively high. In addition, the cleaning mechanism 100 is automatically operated by the driving member 20, so that a cleaning quality is improved. Furthermore, only one driving member 20 is needed to perform movements along two different directions, such that a manufacturing cost of the cleaning mechanism 100 is relatively low.

In other embodiments, the second pushing plate 32 can be omitted, and the connection shafts 80 are directly connected to a middle portion of the first pushing plate 31. A plurality of protrusions can be formed on the first movable plates 40 or the second movable plates 60, and a plurality of grooves can be accordingly defined in the first clipping plates 50 or the second clipping plates 70, or vise verse.

It is to be understood, however, that even through numerous characteristics and advantages of the disclosure have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A cleaning mechanism for an injection molding machine, the cleaning mechanism comprising:
   a base comprising a mounting frame;
   a driving member;
   a pushing member connected to the driving member, and the pushing member comprising a first pushing plate;
   at least one first movable plate movably mounted on the mounting frame, the at least one first movable plate being fixed to and perpendicular to the first pushing plate;
   at least one first clipping plate mounted on the mounting frame, corresponding to the at least one first movable plate, and perpendicular to the first pushing plate;
   at least one connection shaft rotatably connected to the at least one first pushing plate;
   at least one second movable plate movably mounted on the mounting frame and parallel to the first pushing plate, wherein the at least one second movable plate is rotatably connected to the connection shaft, so that the at least one second movable plate is connected to the first pushing plate by the connection shaft; and
   at least one second clipping plate mounted on the mounting frame, corresponding to the at least one second movable plate, and parallel to the first pushing plate;
   wherein when the pushing member is driven by the driving member, the at least one first movable plate moves relative to the at least one first clipping plate, and the at least one second movable plate moves relative to the at least one second clipping plate.

2. The cleaning mechanism for an injection molding machine of claim 1, wherein the pushing member further comprises a second pushing plate perpendicularly connected to the first pushing plate, a first connection portion formed on one end of the first pushing plate, and a second connection portion formed on the other end of the first pushing plate, the at least one first movable plate comprises two first movable plates, the at least one first clipping plate comprises two first clipping plates, one of the two first movable plates is fixed to the first connection portion, and the other of the two first movable plates is fixed to the second connection portion.

3. The cleaning mechanism for an injection molding machine of claim 2, wherein a first guiding groove is defined in the first pushing plate, the base further comprises a first guiding block movably received in the first guiding groove.

4. The cleaning mechanism for an injection molding machine of claim 3, wherein the at least one second movable plate comprises two second movable plates, the at least one connection shaft comprises two connection shafts placed on two sides of the first pushing plate, one end of each of the two connection shafts is rotatably connected to one of the two second movable plates, and the other end of the each of the two connection shafts is rotatably connected to the second pushing plate.

5. The cleaning mechanism for an injection molding machine of claim 4, wherein the cleaning mechanism further comprises two connection plates, each of the two second movable plates is connected to one of the two connection shafts by one of the two connection plates.

6. The cleaning mechanism for an injection molding machine of claim 5, wherein two second guiding grooves are defined in the connection plate, the base further comprises two second guiding blocks movably received in the two second guiding grooves, and each of the two second guiding blocks is connected to each of the two connection shafts.

7. The cleaning mechanism for an injection molding machine of claim 6, wherein the mounting frame comprises a first guiding portion, a second guiding portion perpendicular to the first guiding portion, a first mounting portion, a second mounting portion, a third mounting portion, and a fourth mounting portion, the first mounting portion, the second mounting portion, the third mounting portion, and the fourth mounting portion are connected to each other in an end-to-end configuration, and cooperatively form an enclose frame surrounding the first guiding portion and the second guiding portion, the first guiding block is formed on the first guiding portion, and the two second guiding blocks are formed on the second guiding portion.

8. The cleaning mechanism for an injection molding machine of claim 7, wherein the cleaning mechanism further comprises two connection frames, each of the two connection frames is connected to one end of each of the two connection plates, sleeved on the second guiding portion, and is fixed to one of the two second movable plates.

9. The cleaning mechanism for an injection molding machine of claim 1, wherein the base further comprises a mounting seat, the mounting seat comprises a first mounting plate fixed to the mounting frame and a second mounting plate perpendicularly fixed to the first mounting plate, the driving member is mounted on the first mounting plate.

10. The cleaning mechanism for an injection molding machine of claim 1, wherein the driving member comprises a main portion, a driving shaft connected to the main portion, and a connection portion connected to a free end of the driving shaft, the pushing member is fixed to the connection portion of the driving member.

11. The cleaning mechanism for an injection molding machine of claim 1, wherein the driving member comprises a cylinder.

12. A cleaning mechanism for an injection molding machine, the cleaning mechanism comprising:
- a base comprising a mounting frame and a mounting seat, wherein the mounting seat comprises a first mounting plate fixed to the mounting frame and a second mounting plate perpendicularly fixed to the first mounting plate;
- a driving member comprising a main portion mounted on the first mounting plate, a driving shaft connected to the main portion, and a connection portion connected to a free end of the driving shaft;
- a pushing member connected to the connection portion of the driving member, and the pushing member comprising a first pushing plate;
- at least one first movable plate movably mounted on the mounting frame, the at least one first movable plate being fixed to and perpendicular to the first pushing plate;
- at least one first clipping plate mounted on the mounting frame, corresponding to the at least one first movable plate, and perpendicular to the first pushing plate;
- at least one connection shaft rotatably connected to the at least one first pushing plate;
- at least one second movable plate movably mounted on the mounting frame and parallel to the first pushing plate, wherein the at least one second movable plate is rotatably connected to the connection shaft, so that the at least one second movable plate is connected to the first pushing plate by the connection shaft; and
- at least one second clipping plate mounted on the mounting frame, corresponding to the at least one second movable plate, and parallel to the first pushing plate;
- wherein when the pushing member is driven by the driving member, the at least one first movable plate moves relative to the at least one first clipping plate, and the at least one second movable plate moves relative to the at least one second clipping plate.

13. The cleaning mechanism for an injection molding machine of claim 12, wherein the pushing member further comprises a second pushing plate perpendicularly connected to the first pushing plate, a first connection portion formed on one end of the first pushing plate, and a second connection portion formed on the other end of the first pushing plate, the at least one first movable plate comprises two first movable plates, the at least one first clipping plate comprises two first clipping plates, one of the two first movable plates is fixed to the first connection portion, and the other of the two first movable plates is fixed to the second connection portion.

14. The cleaning mechanism for an injection molding machine of claim 13, wherein a first guiding groove is defined in the first pushing plate, the base further comprises a first guiding block movably received in the first guiding groove.

15. The cleaning mechanism for an injection molding machine of claim 14, wherein the at least one second movable plate comprises two second movable plates, the at least one connection shaft comprises two connection shafts placed on two sides of the first pushing plate, one end of each of the two connection shafts is rotatably connected to one of the two second movable plates, and the other end of the each of the two connection shafts is rotatably connected to the second pushing plate.

16. The cleaning mechanism for an injection molding machine of claim 15, wherein the cleaning mechanism further comprises a connection plate, the two second movable plates are connected to the two connection shafts by the connection plate.

17. The cleaning mechanism for an injection molding machine of claim 16, wherein two second guiding grooves are defined in the connection plate, the base further comprises two second guiding blocks movably received in the two second guiding grooves, and each of the two second guiding blocks is connected to each of the two connection shafts.

18. The cleaning mechanism for an injection molding machine of claim 17, wherein the mounting frame comprises a first guiding portion, a second guiding portion perpendicular to the first guiding portion, a first mounting portion, a second mounting portion, a third mounting portion, and a fourth mounting portion, the first mounting portion, the second mounting portion, the third mounting portion, and the fourth mounting portion are connected to each other in an end-to-end configuration, and cooperatively form an enclose frame surrounding the first guiding portion and the second guiding portion, the first guiding block is formed on the first guiding portion, and the two second guiding blocks are formed on the second guiding portion.

19. The cleaning mechanism for an injection molding machine of claim 18, wherein the cleaning mechanism further comprises two connection frames, each of the two connection frames is connected to one end of each of the two connection plates, sleeved on the second guiding portion, and is fixed to one of the two second movable plates.

20. The cleaning mechanism for an injection molding machine of claim 11, wherein the driving member comprises a cylinder.

* * * * *